T. Thompson,
Sawing Shingles,
No. 81,435. Patented Aug. 25, 1868.
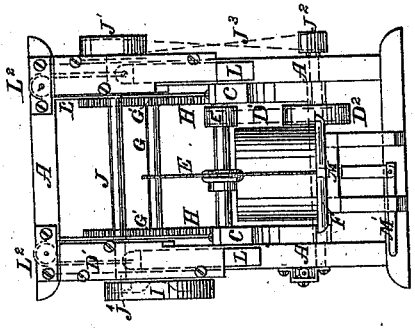
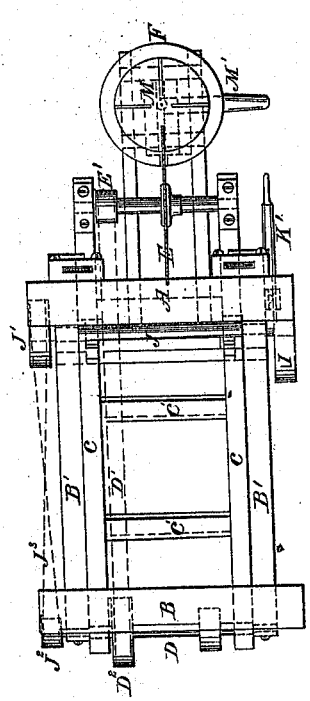
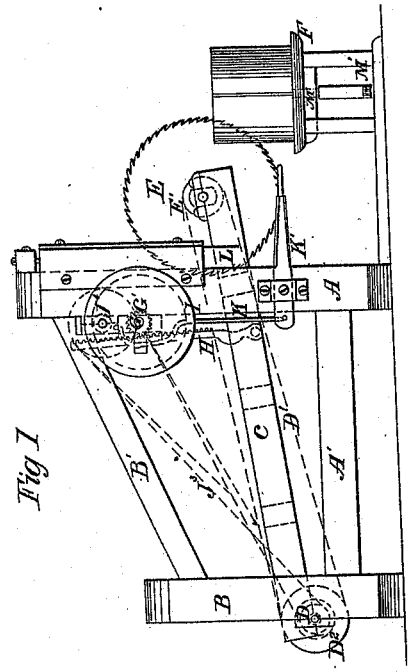
Witnesses:
Edw. Wilhelm
W. H. Forbush
Inventor:
Thos. Thompson.

United States Patent Office.

THOMAS THOMPSON, OF BUFFALO, NEW YORK.

Letters Patent No. 81,435, dated August 25, 1868.

---

IMPROVEMENT IN SHINGLE-BOLT MACHINES.

---

The Schedule referred to in these Letters Patent and making part of the same.

---

TO ALL WHOM IT MAY CONCERN:

Be it known that I, THOMAS THOMPSON, of the city of Buffalo, county of Erie, and State of New York, have invented a certain new and improved Shingle-Bolt Machine; and I do hereby declare that the following is a full, clear, and exact description thereof, reference being had to the accompanying drawings, making a part of this specification, in which—

Figure I is a side elevation of the machine,

Figure II is a front elevation, and

Figure III is a top plan view thereof.

In this machine, the block to be cut into bolts is supported on end upon a horizontal table, and the bolting-saw cuts down through the same vertically and longitudinally; my invention relating—

First, to the mechanism by which the saw is supported, driven, and fed to and from its work, said mechanism consisting essentially of a counterbalanced swinging frame, carrying the bolting-saw, and a reversing friction-feed apparatus, whereby the saw-frame may be raised and lowered, as required.

Second, to the combination and arrangement of a step-lever and pivot-arm with a stationary table, up through the centre of which the latter is projected, so as to facilitate the turning of the block on the table to present its different sides to the action of the saw in dividing it into bolts.

In the accompanying drawings, like letters refer to like parts in each of the figures.

The main framing of the machine consists of a front frame, A, composed of two vertical posts, with sill and cap, and supporting the feeding-mechanism; a back frame, B, also composed of two vertical posts, with sill and cap, and supporting the driving-shaft and swinging-saw frame, said frames, A and B, being connected together by straining-sills A' and braces B'.

The swinging-saw frame consists of two parallel arms or timbers, C, connected together by cross-pieces C', and hinged at one end to the main driving-shaft D, and carrying at its other or swinging end (which projects through and beyond the front frame A) the bolting-saw E.

The block-table F is arranged partially beneath the saw, with its centre vertically in line with the cutting-edge of the saw, while its surface is made level with the centre of the driving-shaft. The table may be supported in any suitable manner, and is provided with a slit in the side next to the saw for the passage of the latter as it descends through the block arranged thereon, as shown in Fig. III.

By this arrangement, the cut of the saw is at right angles, or nearly so, to the table, so that the block requires no dogging or clamping to the table to hold it against the cut of the saw.

Underneath the table F is arranged a step-lever, M', with an arm, M, resting on one end, projecting upward through a hole in the centre of the table. The upper end of this arm is made pointed, with the centre of the block resting thereon. When the block is required to be turned to present a different side to the action of the saw, the foot is applied to the step-lever, which forces the arm M upward under the centre of the block, raising the latter from the surface of the table, and supporting it on the pointed end of the arm, which, operating as a pivot, enables the block to be rotated with great ease and facility.

The saw is driven from the main shaft D by a belt, $D^1$, leading from the pulley $D^2$ thereon to the pulley E' on the saw-shaft, so that the up-and-down swinging of the saw, being upon said driving-shaft as a centre, does not affect the tension of its driving-belt.

The feeding-mechanism, by which the saw is swung up and down, is arranged as follows:

G is a transverse shaft, supported in proper journal-bearings by the front frame A, and above the limit of the upward movement of the saw-frame. G' G' are two pinions upon shaft G, which take hold of two racks, H, projecting up from and hinged to the side arms of the saw-frame. I is a grooved friction-pulley on the end of shaft G. J is a countershaft above shaft G, and parallel thereto, carrying a pulley, $J^1$, at one end, driven from the pulley $J^2$ on the main shaft D by the crossed belt $J^3$.

$J^4$ is a friction-wheel on opposite end of shaft J, working in the grooved friction-wheel I. The bearing of the shaft J, contiguous to its driving-pulley, is made stationary in the post of the frame A, while its bearing, contiguous to its friction-wheel, is made movable, and connected by the rod K with the lever K', so that by a movement of the lever the friction-wheel $J^4$ may be thrown into contact with either the outer or inner periphery of the grooved friction-wheel I.

When thrown in contact with the outer periphery of wheel I, the shaft G will be driven in such direction as will, through the medium of the pinions G' and racks H, feed the saw-frame downward, and cause the saw to cut its way regularly and with proper speed through the block.

When the friction-wheel $J^4$ is thrown in contact with the inner periphery of the grooved wheel I, the motion of the shaft G will be reversed, so that the saw-frame will be raised and the saw withdrawn from the block; this upward movement, owing to the smaller diameter on which wheel $J^4$ acts, being much faster than the downward movement, which exactly meets the requirements of the case, since the saw has no labor to perform during its upward movement.

The weight of the swinging-saw frame and its attendant parts is counterbalanced by the weights L, hung to ropes $L^1$, passing over sheaves, $L^2$, in the cap of the front frame, and connected to the side arms of the frame. This counterbalancing of the saw-frame makes the feeding-movement of the same easy, and retains it at any point desired without fastening.

The block to be cut into bolts is placed upon the table, with its centre coincident, or nearly so, with that of the table, so that the first passage of the saw through it will only cut into its centre, or only half divide it. It is then turned a quarter way round, more or less, and a second cut made similar to the first, and in the same manner a third and fourth, thus dividing the block into bolts of the required size.

Commonly the several cuts are not allowed to quite meet each other, so that the block will hold together until all the cuts are made, when the concussion incident to the throwing down of the block from the table will complete the separation.

The general arrangement of the machine is one of great convenience, simplicity, and durability, and performs its work with great rapidity and small waste of power.

Having thus described my invention, what I claim, and desire to secure by Letters Patent, is—

1. The arrangement of the rack-bars H, pinions G', friction-wheels I and $J^4$, and shifting-rod and lever K K', with the counterbalanced swinging-saw frame C, as a means of raising and lowering the same, as set forth.

2. The step-lever M' and pivot-arm M, in combination with the stationary table F, provided with a slit in one side for the passage of the saw, arranged and operating in the manner, for the purpose described.

THOS. THOMPSON.

Witnesses:
   EDW. WILHELM,
   W. H. FORBUSH.